US012289228B2

(12) United States Patent
Sabando et al.

(10) Patent No.: US 12,289,228 B2
(45) Date of Patent: Apr. 29, 2025

(54) CELL SITE ROUTER (CSR) AND SERVER CABLING VERIFICATION

(71) Applicant: DISH Wireless L.L.C., Englewood, CO (US)

(72) Inventors: John Sabando, Littleton, CO (US); Jeremy Lewis, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 247 days.

(21) Appl. No.: 18/162,958

(22) Filed: Feb. 1, 2023

(65) Prior Publication Data

US 2024/0259291 A1 Aug. 1, 2024

(51) Int. Cl.
*G06F 13/00* (2006.01)
*H04L 45/00* (2022.01)
*H04L 45/02* (2022.01)
*H04L 45/74* (2022.01)

(52) U.S. Cl.
CPC .............. *H04L 45/02* (2013.01); *H04L 45/66* (2013.01); *H04L 45/74* (2013.01)

(58) Field of Classification Search
CPC .......... H04L 45/02; H04L 45/66; H04L 45/74
USPC ........................ 709/245, 238; 706/13, 12, 16
See application file for complete search history.

(56) References Cited

U.S. PATENT DOCUMENTS

| | | | | |
|---|---|---|---|---|
| 8,737,410 B2* | 5/2014 | Davis | ................ | H04L 45/74591 370/400 |
| 8,745,302 B2* | 6/2014 | Davis | .................... | H04L 49/253 710/313 |
| 9,008,079 B2* | 4/2015 | Davis | ...................... | H04L 45/60 370/384 |
| 11,343,762 B1* | 5/2022 | Marupaduga | ......... | H04W 76/15 |
| 11,659,483 B1* | 5/2023 | Marupaduga | ......... | H04W 48/20 370/503 |
| 2011/0103391 A1* | 5/2011 | Davis | .................... | G06F 1/3234 370/400 |

* cited by examiner

*Primary Examiner* — Kenneth R Coulter
(74) *Attorney, Agent, or Firm* — Capitol City TechLaw; Jasbir Singh

(57) ABSTRACT

A method for cabling verification of a Cell Site Router (CSR) including CSR ports that are cabled to a server including server ports, the method including: providing a wiring configuration including pairings including a CSR port ID of one of the CSR ports and a server port ID of one of the server ports; connecting, with cables, the server ports with the CSR ports per the pairings; getting, on the server, addresses of the server ports; learning, at the CSR, distal addresses of the server ports connected to each of the CSR ports; matching, based on the pairings, a respective address of a respective server port ID with a respective distal address of a respective CSR port ID. In some embodiments, the getting may be performed by the CSR and the learning may be performed by the server.

20 Claims, 5 Drawing Sheets

```
conf t
lldp
interface GigabitEthernet0/0/0/2
mtu 9216
l2transport
no shut
l2vpn
bridge group TEST
bridge-domain TEST
description TEST
interface GigabitEthernet0/0/0/2
interface TenGigE0/0/0/13
no shut
interface TenGigE0/0/0/14
no shut
interface TenGigE0/0/0/15
no shut
interface TenGigE0/0/0/18
no shut
int TF0/0/0/24
no shut
commit
```

FIG. 6A

```
set NIC.NICConfig.1.INTEL_LLDPAgent
Enabled
set NIC.NICConfig.2.INTEL_LLDPAgent
Enabled
set NIC.NICConfig.3.INTEL_LLDPAgent
Enabled
set NIC.NICConfig.4.INTEL_LLDPAgent
Enabled
jobqueue create NIC.Slot.2-1
jobqueue create NIC.Slot.2-2
jobqueue create NIC.Slot.2-3
jobqueue create NIC.Slot.2-4 -r forced
```

FIG. 6B

```
set NIC.NICConfig.1.INTEL_LLDPAgent Disabled
set NIC.NICConfig.2.INTEL_LLDPAgent Disabled
set NIC.NICConfig.3.INTEL_LLDPAgent Disabled
set NIC.NICConfig.4.INTEL_LLDPAgent Disabled
jobqueue create NIC.Slot.2-1
jobqueue create NIC.Slot.2-2
jobqueue create NIC.Slot.2-3
jobqueue create NIC.Slot.2-4 -r forced
```

FIG. 6C

| CSR Port ID | CSR MAC Learning | iDRAC Port ID | iDRAC MAC Info | Port Match Status |
|---|---|---|---|---|
| Gi0/0/0/2 | 30d0.42db.c502 | iDRAC | 30:D0:42:DB:C5:02 | MATCH |
| TenGigE0/0/0/13 | 40a6.b778.c4fc | NIC.Slot.2-1 | 40:A6:B7:78:C4:FC | MATCH |
| TenGigE0/0/0/14 | 40a6.b778.c4fe | NIC.Slot.2-3 | 40:A6:B7:78:C4:FE | MATCH |
| TenGigE0/0/0/15 | 40a6.b778.c4ff | NIC.Slot.2-4 | 40:A6:B7:78:C4:FF | MATCH |
| TenGigE0/0/0/18 | 30d0.42db.c508 | NIC.Embedded.1-1-1 | 30:D0:42:DB:C5:08 | MATCH |
| TwentyFiveGigE0/0/0/24 | 40a6.b778.c4fd | NIC.Slot.2-2 | 40:A6:B7:78:C4:FD | MATCH |
| CSR Software | | | | |

FIG. 7

CELL SITE ROUTER (CSR) AND SERVER CABLING VERIFICATION

FIELD

A system and method to provide Cell Site Router (CSR) and Server Cabling Verification. A CSR and a server may be co-located at tens of thousands of sites. Connectivity verification between the two lends to correct operation of a vast cellular backbone network and save field technician deployment costs and delays.

BACKGROUND

Cellular networks are highly complex. Historically, such as up to and including 4G Long Term Evolution (LTE) cellular networks, many cellular network components were implemented using specialized hardware. The advent of open radio access networks (O-RAN) and virtualization allows for the functionality of many cellular network components to be implemented as software executed on general-purpose hardware platforms. Since dozens or hundreds of different software components need to communicate and function in concert, and vary independently of the supporting hardware and infrastructure, in order for the cellular network to function, extensive testing of the cellular network is necessary.

Connectivity between the CSR is established by cabling a plurality of network ports (such as Ethernet ports) between the CSR and the server. Correct operation of the CSR and server requires particularity on how the network ports between the two are connected. However, the ports look alike, and cabling mistakes can be costly to fix, especially as they require dispatching a technician to a base station site. In the prior art, cable verification depends on a visual inspection of the cabling.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

By performing an accurate cable verification between a CSR (such as, a CISCO CSR) and a server (such as, Dell XR11) the possibility of port swap issues that result in site integration fall-out are eliminated. Possibility of inoperable cables and/or ports is also reduced. The verification may be performed prior to shipping or after deployment at a site. The verification may be performed at a staging area before shipping it to a base station site, for example, by a technician. The verification provides for a more robust deployment of cellular base stations.

In some aspects, the techniques described herein relate to a method for cabling verification of a Cell Site Router (CSR) including CSR ports that are cabled to a server including server ports, the method including: providing a wiring configuration including pairings including a CSR port ID of one of the CSR ports and a server port ID of one of the server ports; connecting, with cables, the server ports with the CSR ports per the pairings; getting, on the server, addresses of the server ports; learning, at the CSR, distal addresses of the server ports connected to each of the CSR ports; matching, based on the pairings, a respective address of a respective server port ID with a respective distal address of a respective CSR port ID.

In some aspects, the techniques described herein relate to a method, wherein the matching includes normalizing the addresses and the distal addresses.

In some aspects, the techniques described herein relate to a method, wherein the addresses and the distal addresses are Media Access Control (MAC) addresses.

In some aspects, the techniques described herein relate to a method, further including generating rows including pairings, the respective address, the respective distal address and a match status.

In some aspects, the techniques described herein relate to a method, wherein the match status is color coded.

In some aspects, the techniques described herein relate to a method, wherein the pairings identify cabling for Baseboard Management Controller (BMC), EXSi Management, Precision Timing Protocol (PTP), front-haul and mid-haul network traffic.

In some aspects, the techniques described herein relate to a method, wherein an implementation of the method includes a Python script.

In some aspects, the techniques described herein relate to a method, further including accessing the CSR and the server via a jump server.

In some aspects, the techniques described herein relate to a method, further including parallelizing the getting, the learning and the matching, wherein the CSR includes a plurality of CSRs.

In some aspects, the techniques described herein relate to a cable verification system for a Cell Site Router (CSR) including CSR ports that are cabled to a server including server ports, the cable verification system including: a wiring configuration including pairings including a CSR port ID of one of the CSR ports and a server port ID of one of the server ports; cables to connect the server ports with the CSR ports per the pairings; and a script for getting, on the server, addresses of the server ports, learning, at the CSR, distal addresses of the server ports connected to each of the CSR ports, and matching, based on the pairings, a respective address of a respective server port ID with a respective distal address of a respective CSR port ID.

In some aspects, the techniques described herein relate to a cable verification system, wherein the matching includes normalizing the addresses and the distal addresses.

In some aspects, the techniques described herein relate to a cable verification system, wherein the addresses and the distal addresses are Media Access Control (MAC) addresses.

In some aspects, the techniques described herein relate to a cable verification system, wherein the script generates rows including pairings, the respective address, the respective distal address and a match status.

In some aspects, the techniques described herein relate to a cable verification system, wherein the pairings identify cabling for Baseboard Management Controller (BMC), EXSi Management, Precision Timing Protocol (PTP), front-haul and mid-haul network traffic.

In some aspects, the techniques described herein relate to a cable verification system, further including a jump server to access the CSR and the server, and to parallelize the getting, the learning and the matching, wherein the CSR includes a plurality of CSRs.

In some aspects, the techniques described herein relate to a method for cabling verification of a Cell Site Router (CSR) including CSR ports that are cabled to a server including server ports, the method including: providing a wiring configuration including pairings including a CSR port ID of one of the CSR ports and a server port ID of one of the server ports; connecting, with cables, the server ports with the CSR ports per the pairings; getting, on the CSR, addresses of the CSR ports; learning, at the server, distal addresses of the CSR ports connected to each of the server ports; matching, based on the pairings, a respective address of a respective CSR port ID with a respective distal address of a respective server port ID.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 6A, FIG. 6B, and FIG. 6C illustrate exemplary script excerpts of a cabling verification program according to various embodiments.

FIG. 7 illustrates an output of the method 500 according to various embodiments.

Figure 1:
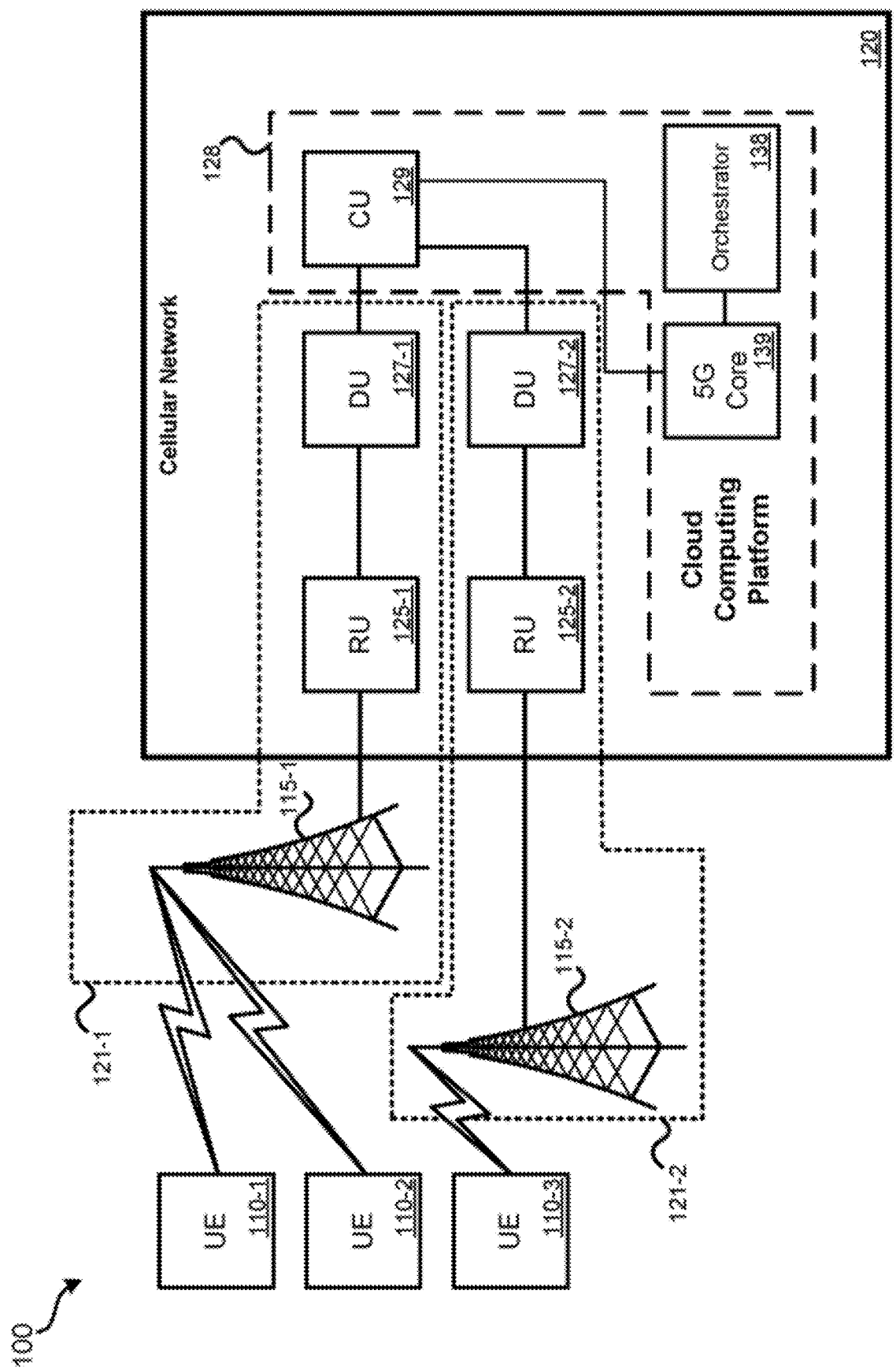
FIG. 1 illustrates an embodiment of a hybrid cloud cellular network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

FIG. 1 illustrates a block diagram of a hybrid cellular network system ("system 100"). System 100 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), most components, except for components that need to receive and transmit RF, can be implemented as specialized software executed on general-purpose hardware or servers. For at least some components, the hardware may be maintained by a separate cloud-service computing platform provider. Therefore, the cellular network operator may operate some hardware (such as, RUs and local computing resources on which DUs are executed) connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE 110 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, or the like. Depending on the location of individual UEs, UE 110 may use RF to communicate with various BSs of cellular network 120. BS 121 may include an RU (e.g., RU 125-1) and a DU (e.g., DU 127-1). Two BSs 121 (BS 121-1 and BS 121-2) are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on a cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools). While this instantiation of a DU may be triggered by orchestrator 138, a chaos test system may introduce false DU container images in the repo, may introduce latency or memory issues in Kubernetes, may vary traffic messaging, and/or create other "chaos" in order to conduct the test. That is, chaos test system is not only connected to a DU, but is connected to all the layers and systems above and below a DU, as an example.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

A cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
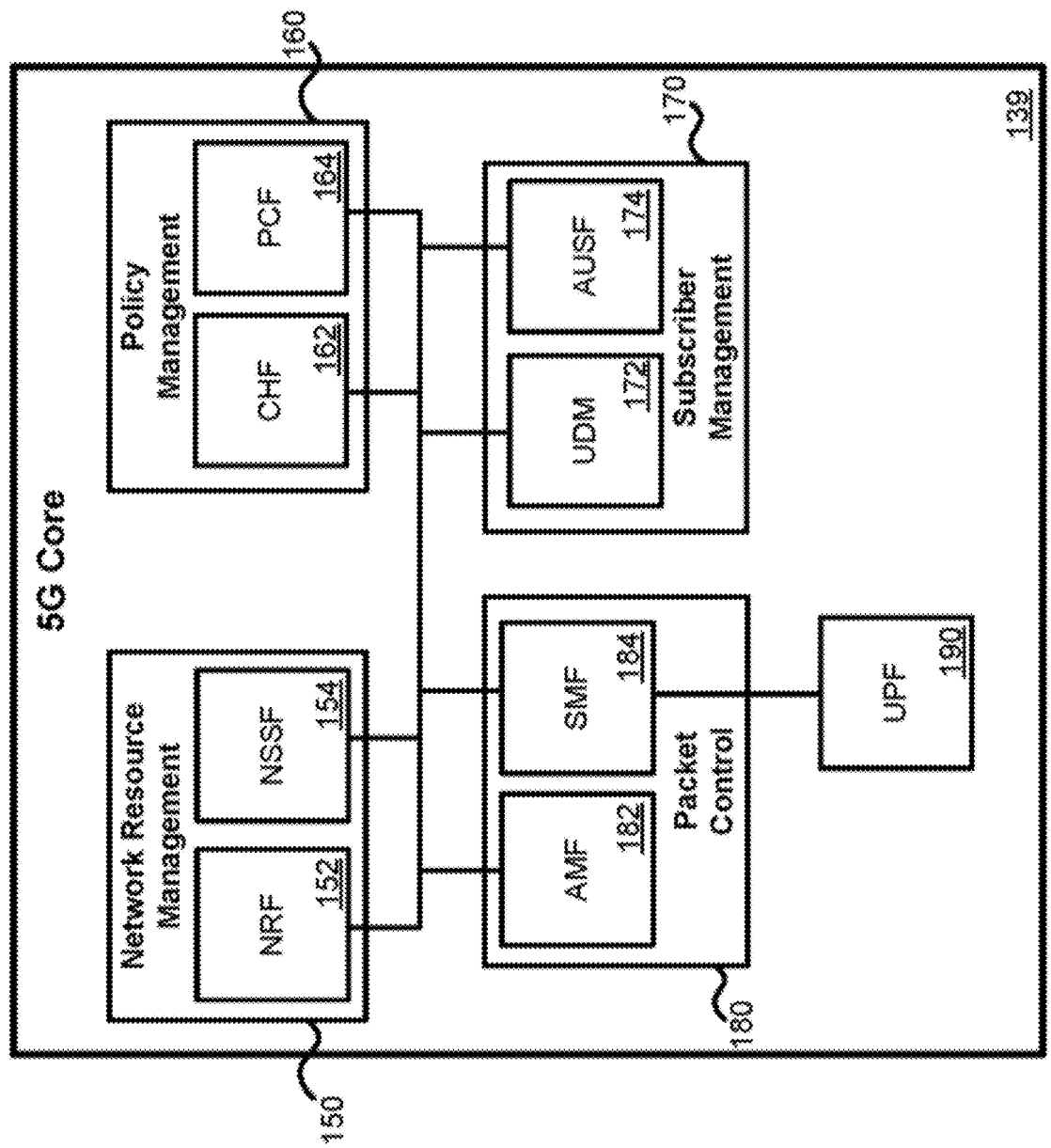
FIG. 2 illustrates an embodiment of a 5G Core.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
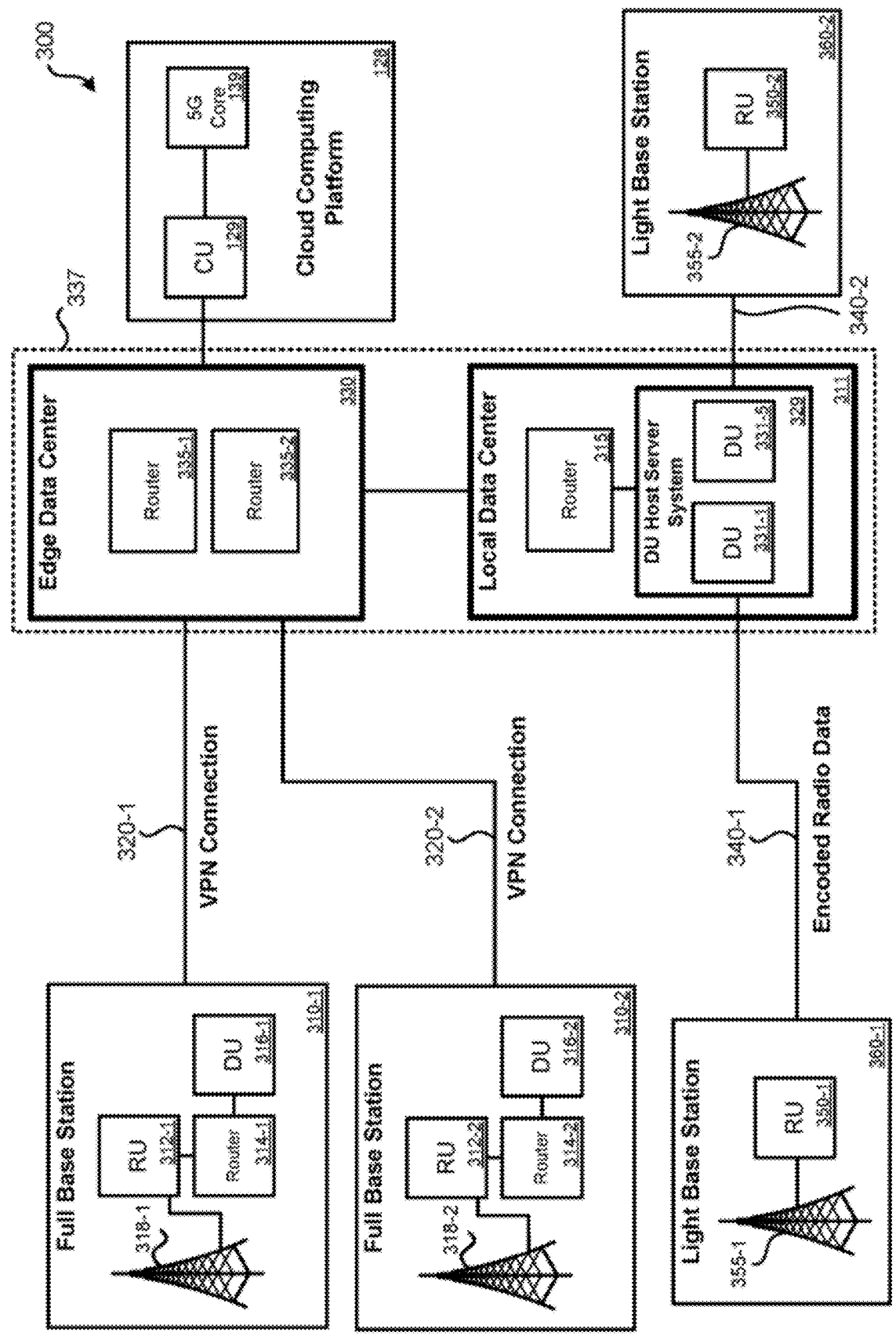
FIG. 3 illustrates an embodiment of a hybrid cloud cellular network architecture.

FIG. 3 illustrates an embodiment of hybrid cellular network system 300 ("system 300") that includes hybrid use of local and remote DUs in communication with a cloud computing platform that hosts the cellular network core. System 300 can include: LDC 311; light BSs 360; full BSs 310; VLAN connections 320; edge data center 330 ("EDC 230"); CU 129; and 5G core 139, which are executed on cloud computing platform 128. In system 300, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC. In system 300, either light BSs 360 or full BSs 310 may be referred to as a cell site.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 310 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 310, which include on-site DUs 316, may connect with the cellular network through EDC 330. A full BS, such as full BS 310-1, can include: RU 312-1; router 314-1; DU 316-1; and structure 318-1. Router 314-1 may have a connection to a high bandwidth communication link with EDC 330. Router 314-1 may route data between DU 316-1 and EDC 330 and between DU 316-1 and RU 312-1. In some embodiments, RU 312-1 and one or more antennas are mounted to structure 318-1, while router 314-1 and DU 316-1 are housed at a base of structure 318-1. Full BS 310-2 functions similarly to full BS 310-1. While two full BSs 310 and two light BSs 360 are illustrated in FIG. 3, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 320-1 between full BSs 310 and EDC 330 may occur over a fiber network. For example, while the connection between light BS 360-1 and LDC 370 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full BS 310-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and EDC 330, it should be understood that other protocols and non-fiber-based networks can be used for connections 320.

For communications across connection 320-1, a virtual local area network (VLAN) may be established between DU 316-1 and EDC 330, when a fiber network that may also be used by other entities is used. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Health Checks

A process for remote and/or onsite verification of cabling accuracy between a cell site router (CSR) and a server is provided. The verification may be performed in a staging environment and a live environment. Verification of cabling accuracy may mitigate occurrence of port swap issues that result in a site integration fall-out.

According to various embodiments, verification includes obtaining and comparing MAC addresses as seen by a Cell Site Router (CSR) and an onsite server with a cabling configuration to verify port accuracy of the cabling. The process may be performed by a computer process. In some embodiments, the computer process may be implemented using Python. The verification may be performed granularly, for example, for a target CSR and server combination. The verification may be batched to verify a group of target CSR and server combinations.

Figure 4:
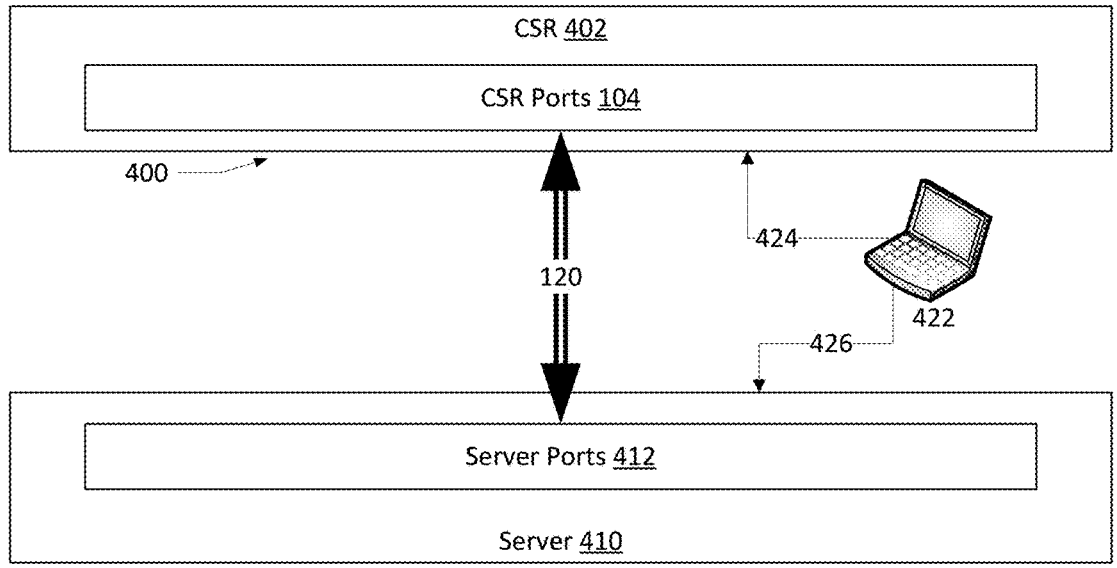
FIG. 4 illustrates a logical view of a cabling verification system for a CSR and a server according to various embodiments.

FIG. 4 illustrates a logical view of a cabling verification system for a CSR and a server according to various embodiments.

In FIG. 4 illustrates a logical view of a cabling verification system 400 for a CSR 402 and a server 410. The cabling verification system 400 may be setup by a technician. The technician may determine a wiring configuration based on a server type of the server 410 and a CSR type of the CSR 402. In some embodiments, there may be only one wiring configuration. The technician then connects cables 420 between the CSR ports 404 and the server ports 412 per the determined wiring configuration. A console 422 is connected to the CSR 402 via a CSR connection 424 and to the server 410 via a server connection 426, and the CSR 402 and the server 410 are powered on. Optionally, the technician inputs port identifiers for the CSR connection 424 and the server connection 426 to a verification program (not shown) hosted on the console 422 and begins execution of the verification program.

The CSR ports 404 may number 1 to N, while the server ports may number 1 to M. The wiring configuration may include connecting cables 420 between the CSR ports 404 and the server ports 412. The wiring configuration may include connecting port number x of CSR ports 404 to port number y of the server ports 412 with one of the cables 420. A count of wires may be greater than or equal to 4, greater than or equal to 6 or the like. A majority of the CSR ports 404 may look alike and be closely packed. A majority of the server ports 412 may look alike and be closely packed. A count of the cables 420 may be greater than 4, greater than 6 or the like. A larger count of the cables 420 increases a likelihood of port swap, even with color coding and the like.

The CSR connection 424 may be a network connection or a USB connection. The server connection 426 may be a network connection or a USB connection. The CSR connection 424 and the server connection 426 may be via a jump server or a trusted IP address. The CSR connection 424 and the server connection 426 may be via a VPN.

Figure 5:
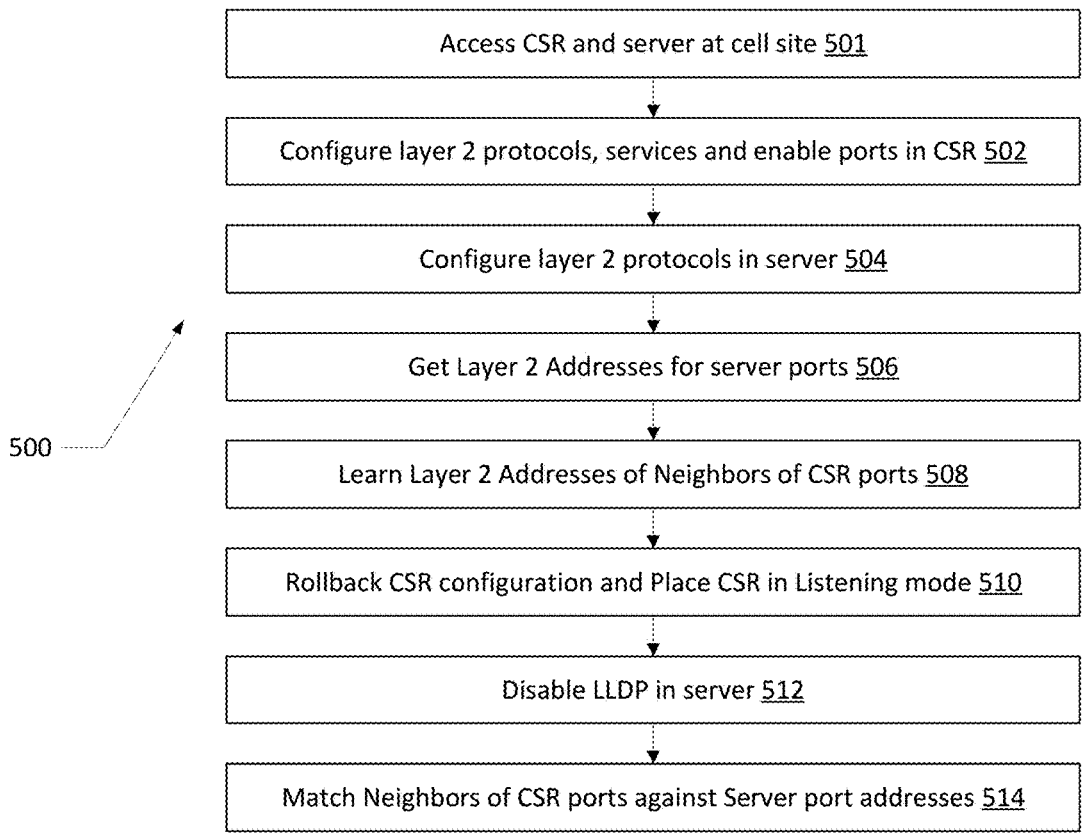
FIG. 5 illustrates a method for cabling verification of a CSR and a server, according to various embodiments.

The verification program may execute and push the entire required configuration, logs, and outputs command used to collect network address information, for example, the MAC address information needed for the wiring configuration. The wiring configuration may include a CSR port ID corresponding to a server port ID. The server port IDs may be different than CSR port IDs. The wiring configuration is further explained with respect to FIG. 7, FIG. 5 illustrates a method for cabling verification of a CSR and a server, according to various embodiments.

FIG. 6A, FIG. 6B, and FIG. 6C illustrate exemplary script excerpts of a cabling verification program according to various embodiments.

A method 500 for cabling verification of a CSR and a server may include an operation 501 to access a CSR and a server at a cell site. The cell site may be a stage cell site or a fielded cell site. The fielded cell site may be full base station or a lite base station. CSRs disposed at a edge data center may be tested via other means. Operation 501 may include collecting a password and target cell site IDs. In operation 501, the target cell site IDs may be entered per line and/or as a file listing the target cell site IDs. For example, after your password has been inserted, a blank text document may be populated with the site IDs of the target CSRs, preferably, one site ID per row. After the document is saved and closed, the script may log into a jump server, and then simultaneously log into each target CSR.

Output for the script may be logged into separate directories, for example, one per cell site. In some embodiments, the script may be threaded and operations for each of the target CSRs/cell sites may be performed in parallel or concurrently. Operation 501 may resolve a network address to connect to a target site and a CSR type to identify the vital interfaces of each target cell site. In some embodiments, the CSR type may be hard coded, for example, a CISCO CSR. In some embodiments, the CSR and server ports may be hard coded for the CSR type. In some embodiments, the jump server may be responsible for resolving network addresses for each cell site name. In some embodiments, the jump server may be replaced by a different identification and authentication methodology.

The method 500 for cabling verification of a CSR and a server may include an operation 502 to configure protocols, services and enable ports in the CSR. The protocols and services may provide layer 2 information for the network ports. The protocol may be the Link Layer Discovery Protocol (LLDP) coupled with a Level 2 Virtual Private Network (L2VPN) service. Operation 502 may be performed per an exemplary script excerpt of FIG. 6A.

A method 500 for cabling verification of a CSR and a server may include an operation 504 to enable the layer 2 protocols, such as, LLDP, on the server. Operation 504 may be performed per an exemplary script excerpt of FIG. 6B.

The method 500 may include operation 506 to get the layer 2 addresses of each network port listed in the wiring configuration of the server. A Media Access Control (MAC) address is a layer 2 address. Operation 506 may be performed using a system command, such as, getsysinfo, hwinventory. The MAC addresses may be obtained from an output of the system command. Exemplary server ports may include a BMC MGMT port, an EXSi MGMT port, a PTP port, a front-haul port, a VMWare MGMT port, a mid-haul port, and the like.

The method 500 may include operation 508 to learn Layer 2 addresses of a distal address of the CSR ports. Each of the distal addresses may be a layer 2 address of a layer 2 neighbor, in other words, the layer 2 address of a network port at a distal end of the cable connecting a respective CSR port to a server port. The CSR may include ports such as a BMC MGMT port, an eXSi MGMT port, a PTP port and multiple DU Ports. The learning of distal layer 2 address is performed by extracting the distal address reported in an output of a CSR command. For example, for a BMC MGMT port the distal address is output by the command "show l2vpn mac-learning mac all location 0/rp0/cpu0". Distal layer 2 addresses of other CSR ports may be learned by extracting MAC addresses from the output of a CSR command, such as "sh lldp neighbors". The learned distal layer 2 addresses may be matched against the addresses retrieved during operation 506.

The method 500 may include operation 510 to rollback the CSR configuration in order to leave the CSR unaffected by the verification program.

The method 500 may include operation 512 to disable the layer 2 service, such as, the LLDP service on the server, for example, with the commands of FIG. 6C.

The method 500 may include operation 512 to check layer 2 addresses of the CSR ports against layer 2 addresses of the server. The check may match the MAC addresses of each wire to validate correct connectivity. The check may normalize the level 2 addresses from the CSR and the server prior to matching them.

FIG. 7 illustrates an output of the method 500 according to various embodiments.

FIG. 7 illustrates an output 700 of the method 500 as rows. The table may include CSR port IDs 702 (canonical names), CSR distal port addresses 704 (Layer 2/MAC addresses of the CSR ports), server port IDs 706 (canonical names), server port addresses 708 (Layer 2/MAC addresses of the server ports), and a match status 710.

Exemplary pairings of a wiring configuration include one of the CSR port IDs 702 and one of the server port IDs 706 listed in a row 714 of the output 700. The CSR port IDs 702 maybe input into commands executed on the CSR by the operations of the method 500. The server port IDs 706 maybe input into commands executed on the server by the operations of method 500. In some embodiments, the pairings of the wiring configuration may be hard coded into a script, for example, a Python script. The pairings may be based on a CSR type and a server type, for example, CSR port IDs may change by a CSR type, or server port IDs may change by a server type.

In the method 500, the server port addresses 708 are populated by the getting per operation 506. For each of the pairings, a respective server port address is populated with the layer 2 address retrieved for the server port ID of the pairing.

In the method 500, the CSR distal port addresses 704 are populated by the learning per operation 508. For each of the pairings, a respective CSR distal address is populated with the layer 2 distal address learned for the CSR port ID of the pairing.

In the method 500, the match status 710 is determined, for example, by the matching per operation 514. The matching may normalize the CSR port addresses 704 and the server port addresses 708 prior to comparing or matching them. If the port addresses match, then the method 500 lists MATCH in the match status 710. If the port addresses do not match, the method 500 lists MISMATCH in the match status 710. The match status 710 may be color-coded, for example, a green background for declaring a match and a red background for declaring a mismatch.

At the staging area, a technician can fix mismatched cabling based on the standard cable connections or wiring configuration. When the CSR and server are in the field, a truck roll may be initiated to fix the mismatched cabling.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for cabling verification of a Cell Site Router (CSR) comprising CSR ports that are cabled to a server comprising server ports, the method comprising:
   providing a wiring configuration comprising pairings comprising a CSR port ID of one of the CSR ports and a server port ID of one of the server ports;
   connecting, with cables, the server ports with the CSR ports per the pairings;
   getting, on the server, addresses of the server ports;
   learning, at the CSR, distal addresses of the server ports connected to each of the CSR ports;
   matching, based on the pairings, a respective address of a respective server port ID with a respective distal address of a respective CSR port ID.

2. The method of claim 1, wherein the matching comprises normalizing the addresses and the distal addresses.

3. The method of claim 1, wherein the addresses and the distal addresses are Media Access Control (MAC) addresses.

4. The method of claim 1, further comprising generating rows comprising one of the pairings, the respective address, the respective distal address and a match status.

5. The method of claim 4, wherein the match status is color coded.

6. The method of claim 1, wherein the pairings identify cabling for Baseboard Management Controller (BMC), EXSi Management, Precision Timing Protocol (PTP), front-haul and mid-haul network traffic.

7. The method of claim 1, wherein an implementation of the method comprises a Python script.

8. The method of claim 1, further comprising accessing the CSR and the server via a jump server.

9. The method of claim 8, further comprising parallelizing the getting, the learning and the matching, wherein the CSR comprises a plurality of CSRs.

10. A cable verification system for a Cell Site Router (CSR) comprising CSR ports that are cabled to a server comprising server ports, the cable verification system comprising:
   a wiring configuration comprising pairings comprising a CSR port ID of one of the CSR ports and a server port ID of one of the server ports;
   cables to connect the server ports with the CSR ports per the pairings; and
   a script for
      getting, on the server, addresses of the server ports,
      learning, at the CSR, distal addresses of the server ports connected to each of the CSR ports, and
      matching, based on the pairings, a respective address of a respective server port ID with a respective distal address of a respective CSR port ID.

11. The cable verification system of claim 10, wherein the matching comprises normalizing the addresses and the distal addresses.

12. The cable verification system of claim 10, wherein the addresses and the distal addresses are Media Access Control (MAC) addresses.

13. The cable verification system of claim 10, wherein the script generates rows comprising one of the pairings, the respective address, the respective distal address and a match status.

14. The cable verification system of claim 10, wherein the pairings identify cabling for Baseboard Management Controller (BMC), EXSi Management, Precision Timing Protocol (PTP), front-haul and mid-haul network traffic.

15. The cable verification system of claim 10, further comprising a jump server to access the CSR and the server, and to parallelize the getting, the learning and the matching, wherein the CSR comprises a plurality of CSRs.

16. A method for cabling verification of a Cell Site Router (CSR) comprising CSR ports that are cabled to a server comprising server ports, the method comprising:
   providing a wiring configuration comprising pairings comprising a CSR port ID of one of the CSR ports and a server port ID of one of the server ports;
   connecting, with cables, the server ports with the CSR ports per the pairings;
   getting, on the CSR, addresses of the CSR ports;
   learning, at the server, distal addresses of the CSR ports connected to each of the server ports;
   matching, based on the pairings, a respective address of a respective CSR port ID with a respective distal address of a respective server port ID.

17. The method of claim 16, wherein the matching comprises normalizing the addresses and the distal addresses.

18. The method of claim 16, wherein the addresses and the distal addresses are Media Access Control (MAC) addresses.

19. The method of claim 16, further comprising generating rows comprising one of the pairings, the respective address, the respective distal address and a match status.

20. The method of claim 16, wherein the pairings identify cabling for Baseboard Management Controller (BMC), EXSi Management, Precision Timing Protocol (PTP), front-haul and mid-haul network traffic.

* * * * *